Figure 3:
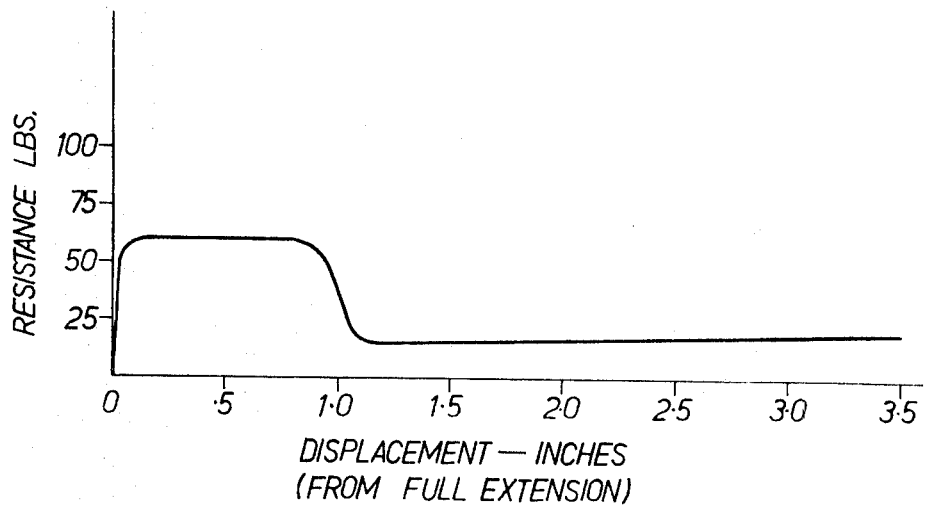

United States Patent

[11] 3,616,881

| [72] | Inventor | Lawrence G. Nicholls<br>Birmingham, England |
|---|---|---|
| [21] | Appl. No. | 864,802 |
| [22] | Filed | Oct. 8, 1969 |
| [45] | Patented | Nov. 2, 1971 |
| [73] | Assignee | Girling Limited |
| [32] | Priorities | Oct. 14, 1968 |
| [33] | | Great Britain |
| [31] | | 48,603/68;<br>Oct. 30, 1968, Great Britain, No.<br>51,641/68 |

[54] TRAILER TOW BAR DAMPERS
7 Claims, 6 Drawing Figs.

[52] U.S. Cl............................................. 188/282,
188/284, 188/318, 188/322
[51] Int. Cl........................................................ F16f 9/49
[50] Field of Search............................................188/88.504,
88.505, 88.51, 88 BA, 96.51, 96.52, 97, 100, 282,
317, 318, 284, 322

[56] References Cited
UNITED STATES PATENTS
2,173,574 9/1939 Binder et al. ................. 188/88 (.51)
3,187,847 6/1965 Karlgaard..................... 188/88 (.505)

FOREIGN PATENTS
952,116 4/1949 France ........................ 188/88 (.504)

*Primary Examiner*—George E. A. Halvosa
*Attorney*—Scrivener, Parker, Scrivener and Clarke ABSTRACT: The invention is an hydraulic, telescopic damper of the piston and cylinder type designed primarily for use in trailer tow bar couplings of the type which includes means for applying the trailer brakes in response to trailer overrun.

Instead of the usual mechanical threshold device employed in such coupling to prevent undesired trailer brake applications, the damper itself has a purely hydraulic threshold arrangement built into it. More specifically, the piston has a one-way piston valve for permitting relatively free flow of liquid from the full bore end of the cylinder to the annulus end during damper contraction, and a piston rod port cooperating with a fixed shroud to check this flow during the first stage of damper contraction from the fully extended (towing) condition. In this first phase, the only escape route for liquid is through a base valve at the full bore end of the cylinder. This base valve has a higher resistance to liquid flow than the piston valve, with the consequence that it creates a high threshold resistance to damper contraction. Once the piston port is uncovered, the resistance is reduced. Preferably, a permanently open control orifice is also provided to restrict the flow of liquid out of the annulus end during damper extension.

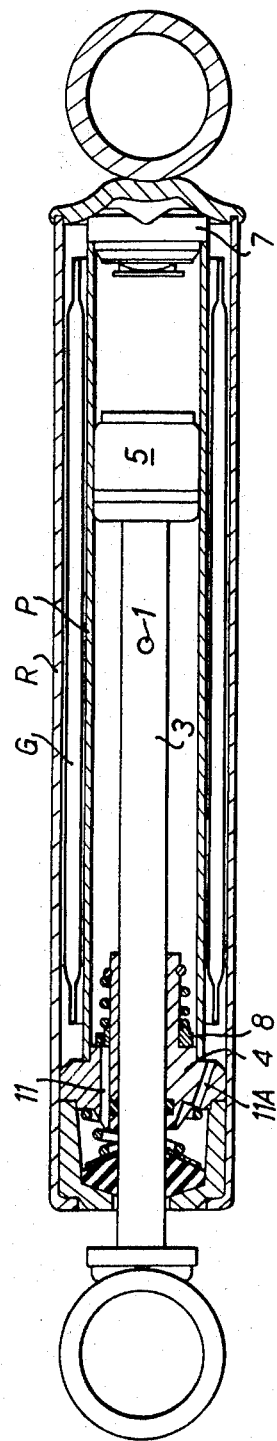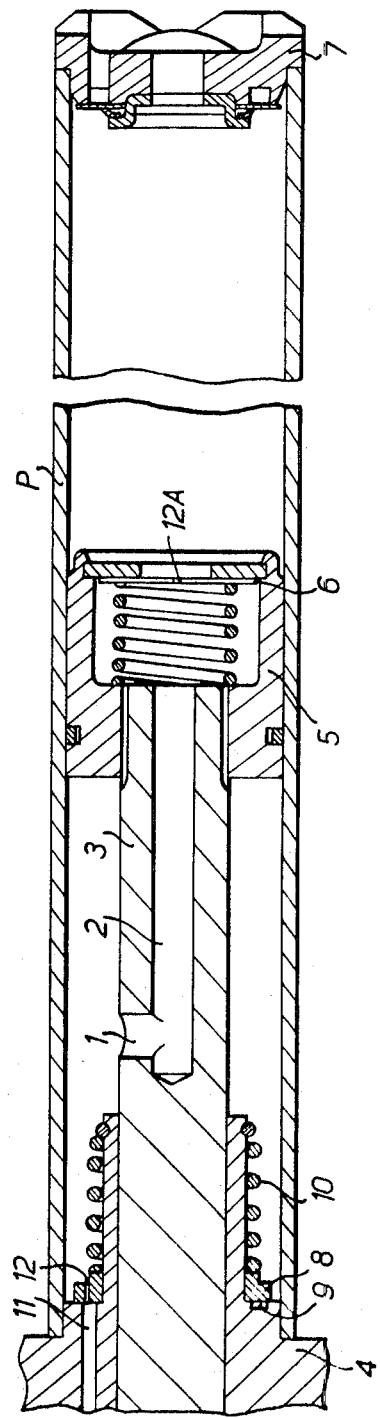
FIG.1.
FIG.2.

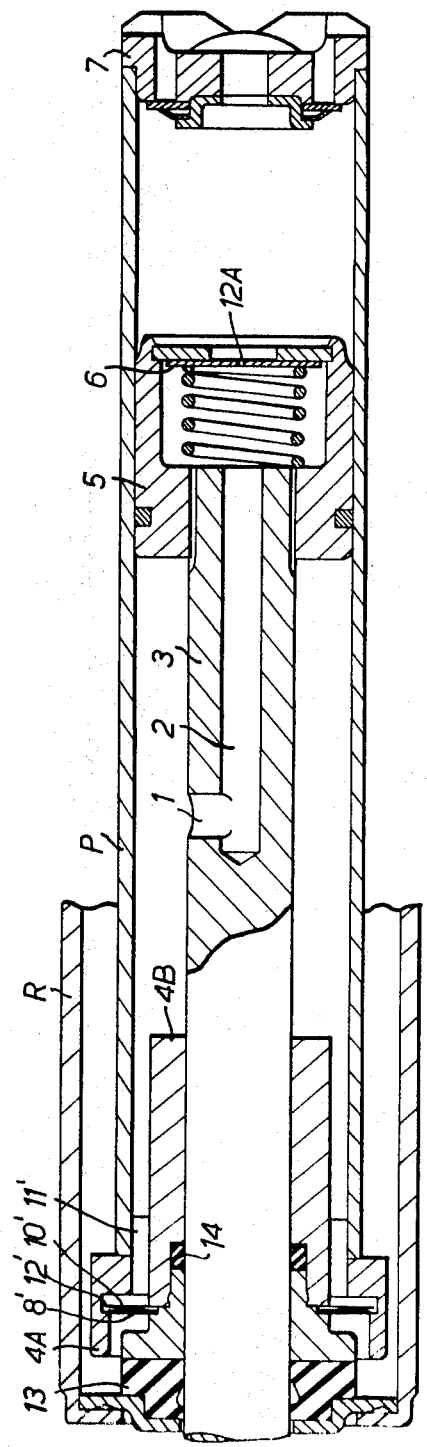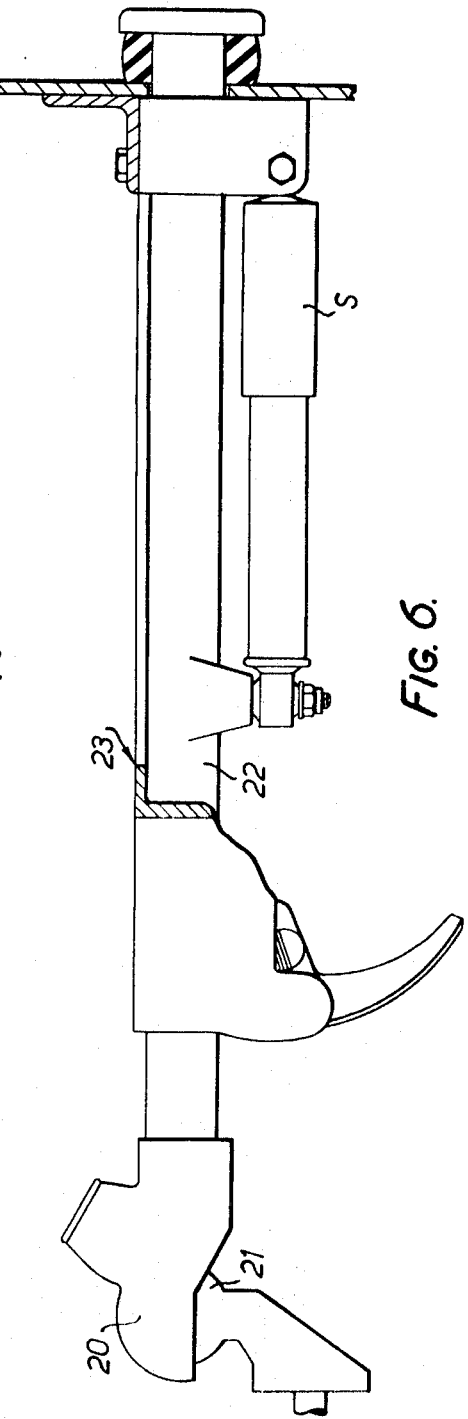

TRAILER TOW BAR DAMPERS

This invention relates to trailer tow bar dampers as used in trailer tow bar couplings to provide control over the compression and extension of such a coupling during braking and acceleration of the towing vehicle, respectively.

In such couplings, it is usual to provide means to actuate the brakes of the towed vehicle in response to overrun of the towed vehicle, and to incorporate some form of threshold device which predetermines a threshold resistance to compression of the damper, below which the trailer brakes are not applied, in order to prevent constantly repeated application of the trailer brakes in response to small decelerations of the towing vehicle. This threshold resistance also allows the trailer brakes to be released when towing commences.

It is known to employ a mechanical latching arrangement to provide the required threshold, but the present invention provides a trailer tow bar damper which incorporates an internal hydraulic threshold device.

More particularly, the invention provides a telescopic hydraulic damper for a trailer tow bar coupling, the damper comprising a cylinder having a piston working therein with a piston rod extending through one end (the annulus end) of the cylinder, a piston valve providing a predetermined resistance to the flow of liquid from the other end (the full bore end) of the cylinder to the annulus end, a piston rod port providing communication between the piston valve and the annulus end of the cylinder, a liquid reservoir, restricted passage means providing communication from the full bore end of the cylinder to the reservoir, the passage means having a greater resistance to liquid flow than the piston valve, and port shrouding means stationarily mounted on the cylinder and positioned to surround the piston rod and thereby close the piston rod port when the piston rod is in an extended position.

With this arrangement the piston port remains closed during the first stage of damper contraction from the fully extended, towing condition, and while this port is closed no flow can take place through the piston valve, leaving the restricted passage at the full bore end of the cylinder as the only escape route by which liquid can leave the full bore end of the cylinder. The resistance to flow offered by this passage is relatively high and this constitutes the threshold resistance. Once this first stage of movement has been completed, the piston rod port is uncovered, to allow flow through the piston valve at under a relatively low resistance to permit overrun with consequential trailer brake application. Thus, the arrangement will be seen to have two distinct advantages. First, it obviates the requirement for a separate mechanical latch to provide threshold resistance and secondly, it is entirely deflection conscious (rather than load conscious), leading to an improved degree of control of overrun characteristics.

The shroud is preferably formed by a tubular extension of a piston rod guide which closes the annulus end of the cylinder, leading to a cheap and simple construction.

Another preferred feature of the invention resides in the provision of a restricted control orifice to permit only restricted flow of liquid from the annulus end of the cylinder, thus serving to damp extension of the cylinder from the rest contracted position and thereby eliminate snatching at the tow bar when the towing vehicle moves away from rest.

This control orifice may be arranged to communicate permanently on the one hand with the annulus end of the cylinder and, on the other hand, with the liquid reservoir, so as to permit restricted flow of liquid from the annulus end throughout the full range of damper extension movement. Alternatively, it may be positioned to connect the full bore end of the cylinder with a point between the piston valve and the piston rod port. In this case, flow through the control orifice is checked when the piston rod port enters the shroud in the last stage of damper extension. This arrangement allows the overrun pressure arising from braking to be relieved more quickly on acceleration, and provides an hydraulic cushion to limit snatching before full extension of the tow bar is reached.

Figure 4:
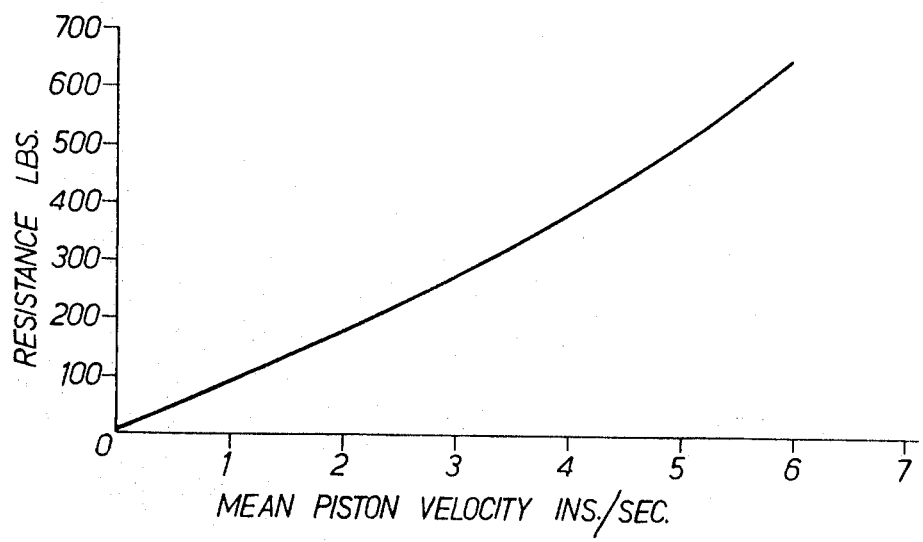

These and other features of the invention will be readily understood from the following description, given by way of example, of two dampers in accordance with the invention and illustrated in the accompanying drawings, in which:

FIG. 1 shows one damper in axial section;
FIG. 2 is an axial section, on a larger scale, of part of the damper shown in FIG. 1;
FIGS. 3 and 4 are graphs illustrating the operating characteristics of the damper;
FIG. 5 is an axial section of the second form of damper; and
FIG. 6 is a part sectional elevation of a trailer tow bar coupling incorporating a damper in accordance with the invention.

The damper shown in FIGS. 1 and 2 is a twin-tube damper having an inner, pressure tube P, an outer reservoir tube R and a gas cell or envelope G in the space between the tubes. The inner and outer tubes communicate with each other through a base valve assembly 7 which includes a recuperation valve for relatively free flow of liquid from the reservoir tube to the pressure tube on damper extension and a restricted passage for flow under pressure in the reverse direction during damper contraction.

At its opposite end, the pressure tube P is fitted with a piston rod guide 4 for a piston rod 3 secured to a piston 5 fitted with a spring-loaded piston valve 6 forming a one-way valve. The rod 3 has an axial passage 2 communicating on the one hand with the downstream side of the piston valve, and on the other hand with a radial port 1.

The rod guide 4 is formed with passages 11 and 11A and provided with an annular one-way valve member 8 loaded against the adjacent face 9 of the guide by a spring 10 so as to close against the end of passage 11. However, a permanently open control orifice 12, formed through the valve member 8, permits restricted flow under pressure from the annulus end of the pressure tube into passage 11.

In operation, under towing conditions, the damper will be fully extended, so that the port 1 is shrouded and closed by the rod guide 4. When the towing vehicle decelerates, the damper tends to contract, and although piston valve 6 opens, no flow takes place through the piston (due to the shrouding of port 1 by guide 4), and liquid in front of the piston can therefore only be displaced through the restricted orifice in the base valve 7. At the same time, the annular valve member 8 unseats to allow liquid to recuperate from the reservoir through passages 11A and 11 to the annulus end of the pressure tube, which is thereby kept full at all times.

As soon as the port 1 emerges from the rod guide, liquid can flow through the piston to fill the increasing space behind the advancing piston, and the volume of liquid flowing through the base valve drops in the ratio of the piston area to the rod area, the damping value, or characteristic, dropping in the same proportion, as illustrated in FIG. 3, which shows the characteristics corresponding to displacement from full extension. The point at which this "threshold" displacement is reached, depends, of course, upon the position of the port 1 along the rod in relation to the rod guide.

When the towing vehicle restarts from rest, the damper is initially compressed, and as it is progressively extended, the valves 6 and 8 are closed and fluid behind the piston is discharged through the control orifice 12 to damp extension and thereby eliminate "snatch" on the tow bar. Recuperation takes place through the base valve 7. The damping characteristic of the orifice 12 is illustrated in FIG. 4.

In some cases, we may prefer to position a control orifice 12A in the valve 6 instead of valve 8, thus increasing the degree of damping on extension as the port 1 reenters the rod guide. This allows the overrun pressure arising from braking to be relieved more quickly on acceleration, but provides an hydraulic cushion to limit snatching before full extension of the tow bar is reached.

Other variations and modifications will, of course, be possible within the scope of the invention. For example, other means may be employed for separating the reservoir gas from the damping fluid when the damper is in its horizontal operating position, such as an eccentrically positioned pressure tube or an external reservoir.

The damper shown in FIG. 5 differs from that of FIGS. 1 and 2 in the construction and arrangement of its rod guide and associated one-way valve.

In this embodiment, the rod guide consists of component parts 4A and 4B which make snap-fitting socket and spigot interengagement, clamping between them an 'O' ring piston rod seal 14.

The guide parts 4A and 4B define between them an external annular recess for mounting the plate valve 8', which is resiliently urged into a closed position by a corrugated spring washer 10'. The parts 4A and 4B also define an internal annular recess for the main piston rod seal 13. The control orifice 12 of the first embodiment now takes the form of a narrow annular gap 12' defined by the outer periphery of the valve 8' and a surrounding annular wall portion of the guide part 4A.

Alternatively, the valve 8' may seat against the lower face of the surrounding annular wall portion and a control orifice 12A can be provided in the piston valve member 6.

Operation corresponds with that of the first embodiment, fluid being recuperated from the reservoir on damper compression through the passage 11', and past the unseated valve 8'.

FIG. 6 illustrates how a damper of the construction described herein can be incorporated in a conventional trailer tow bar coupling comprising a socket 20 for releasable engagement with a ball 21 mounted in use on a towing vehicle. The socket 20 is mounted at the end of a drawbar 22 slidably supported in a bracket structure 23 mounted in use on the trailer. The damper has its piston (fitted with a dirt shield S) connected to the bracket structure and its cylinder connected to the drawbar 22.

In the above-described examples, the damper may be pressurized or unpressurized, as desired.

I claim:

1. A telescopic damper for a trailer tow bar coupling, the damper comprising a cylinder, a piston rod extending through one end (the annulus end) of said cylinder, a piston carried by said piston rod and working in said cylinder, a one-way piston valve on said piston to provide a predetermined resistance to the flow of damper liquid from the opposite end (the full bore end) of said cylinder towards said annulus end, a piston rod port formed in said piston rod and connected in series between said piston valve and said annulus end, a liquid reservoir, restricted passage means providing communication from said full bore end of said cylinder to said reservoir, said passage means calibrated to have a greater resistance to liquid flow than said piston valve, port shrouding means stationarily mounted on said cylinder and positioned to close said piston rod port when said damper is in an extended condition, and one-way recuperative valve means between the reservoir and the annulus end of the cylinder, said valve means being constructed and arranged to open in response to the contraction of said damper to permit the flow of fluid from said reservoir to said annulus end and to close in response to extension of said damper.

2. A damper as claimed in claim 1, including piston rod guide means for guiding said piston rod and having a tubular extension constituting said port shrouding means.

3. A damper as claimed in claim 2, wherein said piston rod guide means consists of two component parts having coaxial, spigot and socket interconnecting means, said interconnected parts defining a first, internal annular recess and a second, external annular recess, said damper further comprising a piston rod packing seal located in said first recess and an annular, flexible valve member arranged as a one-way recuperative valve to permit flow from said reservoir to said annulus end during damper contraction, said valve member having its inner periphery received in said second recess.

4. A damper as claimed in claim 3, wherein one of said component parts has an outer annular wall portion spaced from the outer periphery of said valve member to define therewith a narrow annular control orifice to permit restricted flow from said annulus end of said cylinder to said reservoir throughout damper extension movement.

5. A damper as claimed in claim 1, further comprising control orifice means to permit only restricted flow of liquid out of the annulus end of the cylinder during damper extension.

6. A damper as claimed in claim 5, wherein said control orifice means connects the full bore end of said cylinder with a point between said piston valve and said piston rod port, whereby flow through said orifice is checked when said port is closed by said shroud means.

7. A damper as claimed in claim 5, wherein said control orifice means is in permanent communication on the one hand with the annulus end of said cylinder, and on the other hand with said reservoir, whereby to permit restricted flow throughout damper extension.

* * * * *